C. W. LANG.
PROFILING ATTACHMENT FOR MILLING MACHINES.
APPLICATION FILED JAN. 16, 1920.

1,400,961.

Patented Dec. 20, 1921.
2 SHEETS—SHEET 1.

INVENTOR
Charles W. Lang
BY
Hauff Sbarland
ATTORNEYS

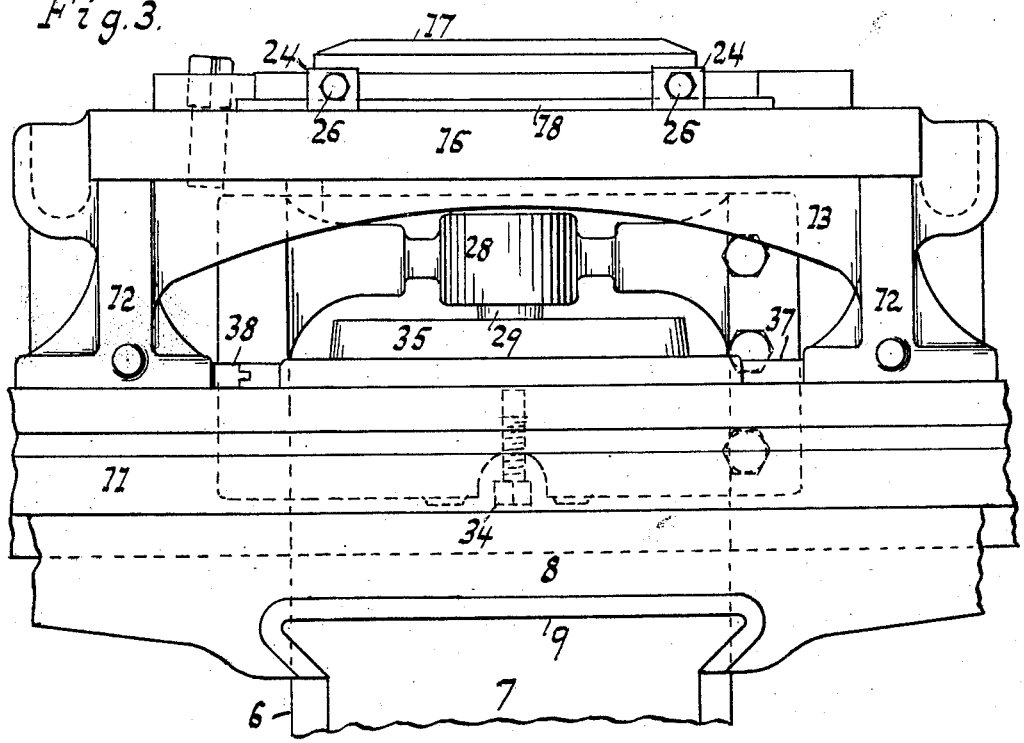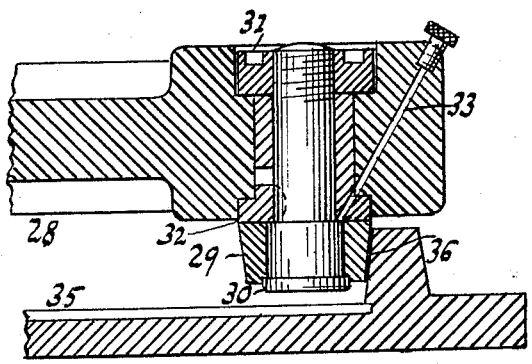

ial No. 351,871.

UNITED STATES PATENT OFFICE.

CHARLES W. LANG, OF BROOKLYN, NEW YORK.

PROFILING ATTACHMENT FOR MILLING-MACHINES.

1,400,961.  Specification of Letters Patent.  Patented Dec. 20, 1921.

Application filed January 16, 1920. Serial No. 351,871.

*To all whom it may concern:*

Be it known that I, CHARLES W. LANG, a citizen of the United States, residing at Brooklyn, in the county of Kings and State of New York, have invented new and useful Improvements in Profiling Attachments for Milling-Machines, of which the following is a specification.

This invention relates to a profiling de10 vice which is especially adapted for attachment to a vertical spindle milling machine in which a rotary cutter operates on the work of the object to be cut, and a traveling table supports the work while it is being shaped.

The present invention is designed to provide the machine with a master form or pattern made to move with the table, and the motion being transmitted to the work, the cutter will shape it to the exact configuration of the die.

An object of the invention is to provide means for centering or alining the guiding means, coöperating with the master form, so that the finished work will be an exact reproduction or duplicate of the contour of the die.

Another object of the invention is to provide a roller tracer or guide to gage or con30 trol the movement of the master form, the axis of which is practically on a line with the axis of the cutter so that the exact position of the cutter relative to the work is governed.

Another object of the invention is to provide means for adjusting the guide roller carrying devices in a vertical plane to position the roller relative to the thickness of the master form.

The invention resides more particularly in the novel combinations hereinafter described and claimed, reference being made to the accompanying drawing in which:

Fig. 3 is a front elevation.

Figure 1:
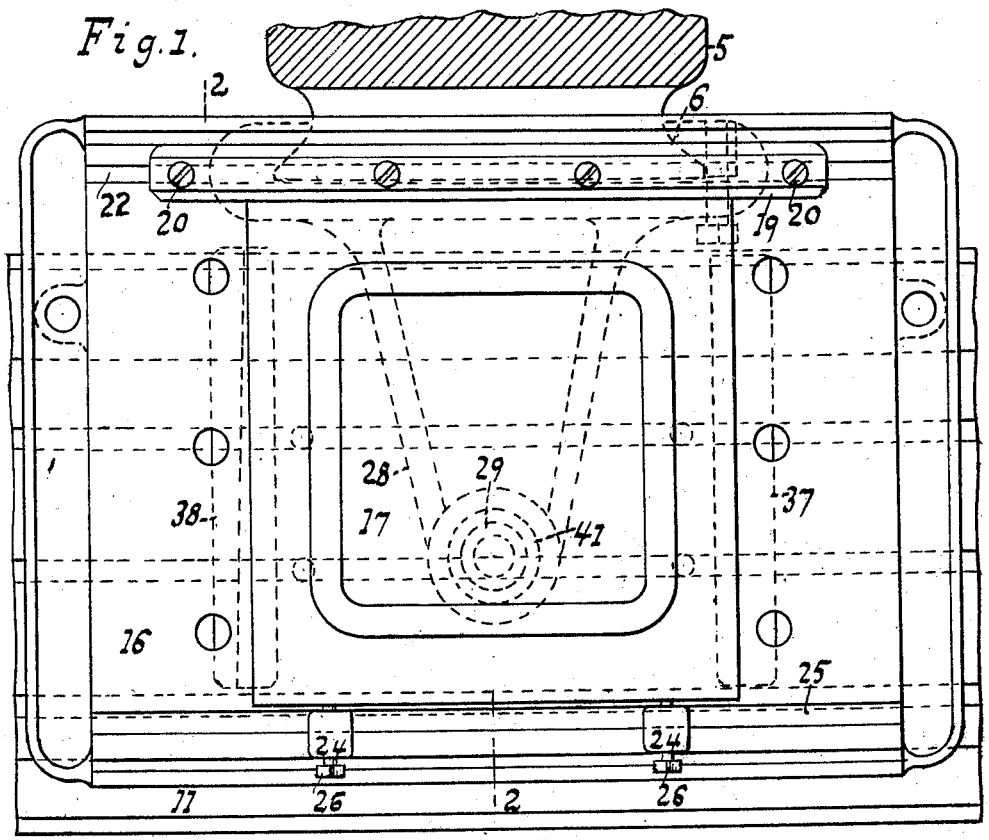
Figure 1 represents a plan view partly in section of a machine embodying this invention.

Fig. 4 is a detail vertical section on a larger scale showing the guide roller or tracer mounted on the arm.

In the drawing the numeral 5 designates a column which is provided with a vertically positioned slide 6 engaged by a knee 7 extending forwardly from the slide. The knee can be slid up or down and controlled by means of a screw or similar device as is well known. On the knee is mounted a slide rest including a saddle 8 made to coact with a groove 9 to permit forward and backward movement of the saddle. The saddle is also provided with a groove 10 extending at right angles to the groove 9 and a table 11 slides in the groove. The foregoing arrangement permits the table to be moved vertically up or down and horizontally slid in a longitudinal or transverse path. The above elements of the milling machine are well known.

Figure 2:
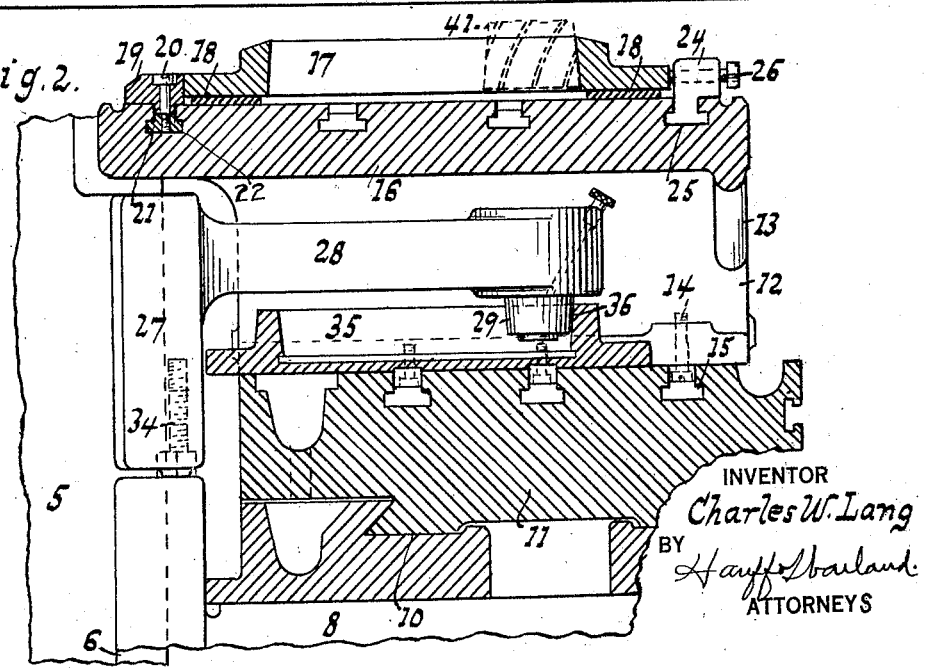
Fig. 2 is a vertical section taken along the line 2—2 of the same.

On the table is arranged a work support consisting of two legs or standards 12 best seen in Fig. 3, having an arched web 13 connecting the standards. The standards are secured to the table by means of screws 14, each being made to engage a block arranged in a slot 15, while the end of the screw coacts with a tapped bore in the base of the standard. When the screws are loosened the blocks can be slid along the slot to any desired position. The standards carry or form an integral part of a table 16 elevated above the lower table. The work 17 or object to be shaped is secured to the top of the table. Between the table and the work is placed a frame 18 of metal strips so as to support and slightly raise the work above the surface of the table. A chuck for centering or alining the work comprises a plate 19 engaging the rear edge of the work, as indicated in Fig. 2. The plate is attached to the table by screws 20, each engaging a block 21 arranged in a slot 22 located in the table. The forward part of the work is held in place by a pair of clamps or lugs 24, mounted in slots 25 disposed in the table. Screws 26 are threaded in the lugs and the ends thereof strike against the forward edge of the work to jam it against the rear plate thus securely holding the work onto the table. By loosening the screws 20 the plate can be moved laterally by sliding the blocks along the slot. Mounted on the upper portion of the slide 6 is a bracket 27 having an arm 28 extending forwardly from the side of the bracket. The bracket can be slid up or down on the slide, but the base thereof as shown in Fig. 2, normally rests on the upper portion of the knee. The arm of the bracket is positioned between the two tables and it carries at its head a tapered guide roller or tracer 29 projecting downwardly. The roller is rotatively mounted on the head, as shown in Fig. 4, by means of a screw 30 having a nut 31 engaging the end of the screw, and set in a socket or counter sunk in the arm. The stem of the screw passes through a bushing or sleeve 32 positioned in a bore adjacent to the socket in the arm. An oil channel 33 extends from the top of the arm into the sleeve to convey oil directly onto the roller. A capstan screw 34 threaded in the bracket is employed to vertically adjust the guide roller carrier to bring the roller in its proper position with the master form and to compensate for any wear on the roller or form.

On the surface of the table 11 is positioned a master form 35 having tapered walls 36 to fit the periphery of the guide roller. Coacting with the side edges of the master form and inner flanges of the table 11 is a parallel strip 37 and on the opposite side a pair of wedges 38 which when tightened will move the inner section against the side of the die to jam it against the opposite member and securely clamp it in place on the table.

The slide rest of the machine permits the master form to be moved in any direction and the guide roller being in contact with the wall of the master form, the motion will be transmitted to the work. A rotary cutter 41 in the same vertical axis as the guide roller will shape the work to correspond to the movement of the master form. The cutter can be mounted on a vertical spindle not shown, and be revolved as is well known. Any object of a given contour or outline can be duplicated, and the guide roller in conjunction with the pattern forms an automatic guide for the cutter controlled by the movement of the tables for shaping the work to any form. The roller being at all times in alinement with the axis of the cutter, a perfect facsimile of the pattern will be cut, and the path traveled by the master form is simultaneously transmitted to the work. By having the work above the form and both being readily accessible from the front it facilitates the labor of the operator and cheapens the cost of production.

The profiling device is shown applied to a vertical spindle machine, but it will be readily understood, that it could be mounted on a horizontal spindle with slight modification.

It will be readily understood the above attachment may be used for grinding purposes by substituting an emery or other grinder in place of the cutting tool.

I claim:

1. In a profiling attachment for milling machines the combination with a movable table having a work support mounted thereon, and a cutter arranged above the table for shaping the work, of a master form carried by the table, a support for the table, and means including an adjustable bracket with a master form guide mounted thereon connected to the support coöperating with the form for guiding the work in a path corresponding to the configuration of the form.

2. In a profiling attachment for milling machines the combination with a slidable table having a work support mounted thereon, and a cutter arranged above the table for shaping the work, of a master form carried by the table, a support for the table, and means including an adjustable bracket with a master form guide mounted thereon connected to the support the guide being practically in a line with the cutter coöperating with the form for moving the work in a path corresponding to the contour of the die.

3. In a profiling attachment for milling machines the combination with a slidable table having a work support mounted thereon, and a vertically arranged cutter for shaping the work, of a master form carried by the table, a column for supporting the table, a bracket connected to the column, and a roller fixed to the bracket in alinement with the axis of the cutter engaging the form for guiding the work in a path corresponding with the shape of the form.

4. In a profiling attachment for milling machines the combination with a column having a slide rest thereon, of a work support connected to the slide rest, a cutter for shaping the work, a master form carried by the slide rest, a vertically movable bracket arranged on the column, and a roller secured to the head of the bracket substantially in a line with the cutter engaging the form for guiding the work in a path corresponding to the contour of the form.

5. In a profiling attachment for milling machines the combination with a column having a slide rest and a table thereon, of a work support arranged above the table connected to the slide rest, a vertical cutter for shaping the work, a master form secured to the table, a vertically movable bracket having an arm extending forwardly from the column below the work, and a roller rotatively mounted on the arm of the bracket in a line with the axis of the cutter coacting with the die for guiding the work support in a path corresponding to the contour of the die.

6. In a profiling attachment for milling machines the combination with a column having a slide rest and a table thereon, of a work support arranged above the table connected to the slide rest, a vertical cutter for shaping the work, a master form secured to the table, a bracket having an arm extending forwardly from the column below the work, a roller rotatively mounted on the arm of the bracket in a line with the axis of the cutter coacting with the die for guiding the work support in a path corresponding to the contour of the die, and a capstan screw carried by the bracket for adjusting it in a vertical plane.

In testimony whereof I have hereunto set my hand in the presence of two subscribing witnesses.

CHARLES W. LANG.

Witnesses:
WM. E. WARLAND,
WILLIAM MILLER.